United States Patent [19]

Wilkins

[11] Patent Number: 4,612,997
[45] Date of Patent: Sep. 23, 1986

[54] SAND FIGHTER WITH FOLDING FRAME

[75] Inventor: Walter B. Wilkins, Lubbock, Tex.

[73] Assignee: Phares and Wilkins Mfg. Co., Lubbock, Tex.

[21] Appl. No.: 751,326

[22] Filed: Jul. 2, 1985

[51] Int. Cl.[4] .................. A01B 63/04; A01B 63/102; A01B 73/04
[52] U.S. Cl. ...................................... 172/776; 172/456
[58] Field of Search ............... 172/311, 456, 776, 310, 172/460

[56] References Cited

U.S. PATENT DOCUMENTS

| | | | |
|---|---|---|---|
| 604,339 | 5/1898 | Rowe | 172/456 |
| 635,746 | 10/1899 | Cochran | 172/456 |
| 2,828,680 | 4/1958 | Johnson | 172/456 X |
| 3,321,028 | 5/1967 | Groenke | 172/311 |
| 3,797,580 | 3/1974 | Roth | 172/311 |
| 4,048,790 | 9/1977 | Zweegers | 172/311 X |
| 4,383,580 | 5/1983 | Huxford | 172/456 X |

Primary Examiner—Richard J. Johnson
Assistant Examiner—Terrence L. B. Brown
Attorney, Agent, or Firm—Wendell Coffee

[57] ABSTRACT

A sand fighter is drawn through an agricultural field by a tractor. The sand fighter has five sections. The outer or distal sections are folded manually. The inner or proximal sections are folded hydraulically. The center or medial section is connected to the power lift of the tractor so the entire sand fighter may be raised and lowered and drafted through the field.

2 Claims, 6 Drawing Figures

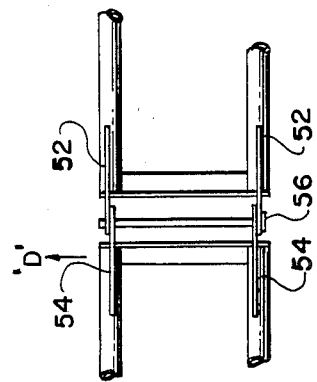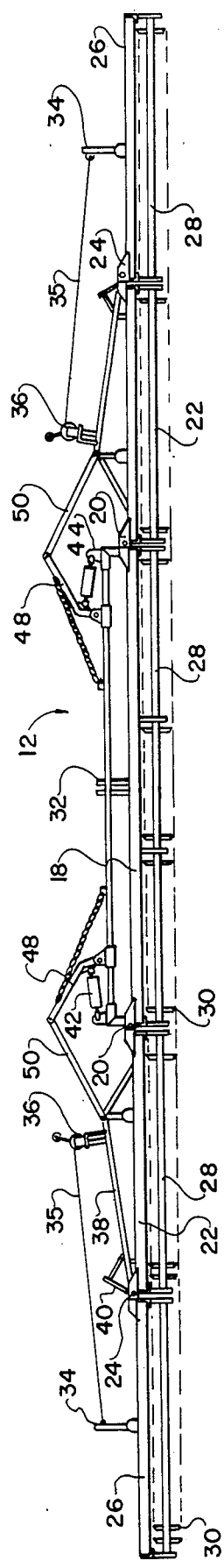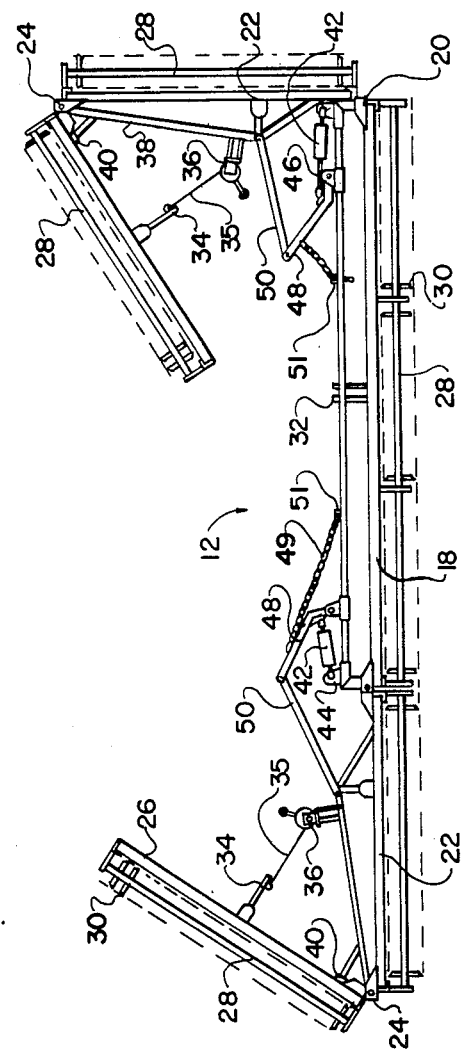

2

SAND FIGHTER WITH FOLDING FRAME

BACKGROUND OF THE INVENTION (1) Field of the Invention

This invention relates to farming, and more particularly to an implement for tilling the soil. Applicant submits that a farm implement manufacturer is one having ordinary skill in this art. Applicant believes this application to be in the field of earth working or agricultural tillers. Therefore, this application is written so that a farm implement manufacturer would be able to make and use the invention.

(2) Description of the Prior Art

The area of West Texas, has sandy soils. After a heavy rain, the lighter portions of the sand within the soil are at the top of the ground. Dry winds will cause the sand to blow in the Spring, injuring tender growing crops.

To prevent the sand from blowing, a tilling implement called "sand fighter" has been developed. It has been found that if the soil is lightly tilled by kicking up damp soil having heavier components measuring about 4 square inches per every square foot, that this will prevent the sand from blowing. The sand fighters in common usage today include a frame extending over considerable distance, e.g., traversing a swath of land 30 or 40 feet wide. One or more shafts is journaled to the frame so that the shafts extend over this 30 to 40 feet of land. Kickers are spaced along the shaft every 6 to 12 inches. Each of the kickers is a bent prong extending radially from the shaft and is adapted to penetrate the soil about one inch and kick up about one square inch of heavy, moist soil.

Since the implement is very light, it can be drafted at high speed across the farm so that within an hour or so, 300 to 400 acres may be "tilled" to the extent necessary to stop the sand from blowing.

Often, the conditions which are conducive to sand blowing occur while the underlying soil is still wet. Therefore, often the sand is blowing while the underlying soil is still wet from the rain and it is therefore desirable as soon as the fields are dry enough to support a tractor that this particular sand fighting procedure be conducted as quickly as possible.

Many of the sand fighters on the market are adapted to be towed by a chain or a hitch behind the tractor, never being elevated. Inasmuch as the implements are inexpensive, sometimes a farmer will have such an implement for each plot of land with no thought that the implement will be transferred from one plot of land to another. It will be understood, that although the implement is not heavy, that moving an implement 40 feet in length is a difficult chore. Also turning the implement at turn rows and the like causes some problem because of its traverse width.

Some sand fighters are carried on the power lift of the tractor which can be raised. Also, some sand fighters are built in sections having two end wings or section which are folded over. With such a sand fighter as this, the sand fighter is easier to turn at the turn rows, and also, a farmer who has several plots of farm land, may move it from one farm or plot to another. It is emphasized that these implements are normally used only once or twice a year, and some years not at all, and in the Spring when the crops are young and small. When the crops get larger, the growing vegetation itself will prevent the sand from blowing. Also, before crops are planted, although the blowing sand may be a source of irritation, it does not do the great economic harm that it does at later periods when it destroys the small tender crops.

Before this application was filed, the applicant caused a search to be made in the U.S. Patent and Trademark Office. The following patents were found on that search:

| Inventor | U.S. Pat. No. | Issue Date |
| --- | --- | --- |
| Huxford | 4,383,580 | May 17, 1983 |
| Taylor | 1,535,058 | Apr 21, 1925 |
| Hansen | 2,604,027 | Jul 22, 1952 |
| Stephenson | 2,750,724 | Jun 19, 1956 |
| Groenke | 3,255,830 | Jun 14, 1966 |
| Groenke | 3,321,028 | May 23, 1967 |
| Shuler et al. | 3,844,358 | Oct 29, 1974 |
| Klindworth | 4,191,260 | Mar 4, 1980 |
| Friggstad | 4,355,689 | Oct 26, 1982 |

Huxford discloses an aerator having frame sections pivoted to one another with a shaft journaled to each of the frame sections and aerators extending from the shafts. The aerator blades are designed to cut the soil.

Groenke '028 discloses a farm implement of the ground working or cultivating type having a plurality of ground working tines or blades (col. 2, line 25). Groenke shows a total of seven foldable sections. The end section of which is folded by hand, and the remainder sections are folded by hydraulics (col. 5).

The remaining patents do not appear to be as pertinent as the two discussed above.

These patents are considered pertinent because the applicant believes the Examiner would consider anything revealed by an experienced patent searcher to be relevant and pertinent to the examination of this application.

SUMMARY OF THE INVENTION (1) New and Different Functions

I have invented an improved folding sand fighter adapted to be carried upon the power lift of a tractor. I have developed such a sand fighter that can be in excess of 83 feet in length, i.e., it would cover up to twentyfive 40 inch rows. The frame of the sand fighter consist of five frame sections. The center one or the medial section has a hitch thereon so that it may be attached to the standard three point hitch of the farm tractor. Either side of the medial section are two proximal sections which may be raised by hydraulic cylinders. A distal section is on the outboard of each of the proximal sections.

I prefer that the distal section be raised by hand. Because sand fighters are basically light weight inexpensive implements, I prefer to use a less expensive method of raising which also is lighter in weight. It will be understood that the sections of the sand fighter will be folded only when moving from one farm or plot to another, and this is not an operation that will take place each time the tractor, with implement attached, is turned on the turn row.

Also, I prefer to support the folding sections when extended by the raising mechanism. It is necessary that they be supported when extended and when raised by the power lift.

(2) Objects of this Invention

An object of this invention is to lightly till cultivated land to prevent sand from blowing.

Further objects are to achieve the above with devices that are sturdy, compact, durable, lightweight, simple, safe, efficient, versatile, ecologically compatible, energy conserving, and reliable, yet inexpensive and easy to manufacture, connect, adjust, operate and maintain.

Other objects are to achieve the above with a method that is rapid, versatile, ecologically compatible, energy conserving, efficient, and inexpensive, and does not require highly skilled people to connect, adjust, operate, and maintain.

The specific nature of the invention, as well as other objects, and advantages thereof, will clearly appear from the following description and from the accompanying drawing, the different views of which are not scale drawings.

BRIEF DESCRIPTION OF THE DRAWINGS

FIG. 4 is a rear elevational view of the sand fighter with the sections extended or in the working position.

FIG. 5 is a rear elevational view of the sand fighter with the left side showing the sections partially folded, and the right side showing the sections completely folded for travel.

FIG. 6 is a partial detail top plan view of a typical hinge.

DESCRIPTION OF THE PREFERRED EMBODIMENT

Figure 1:
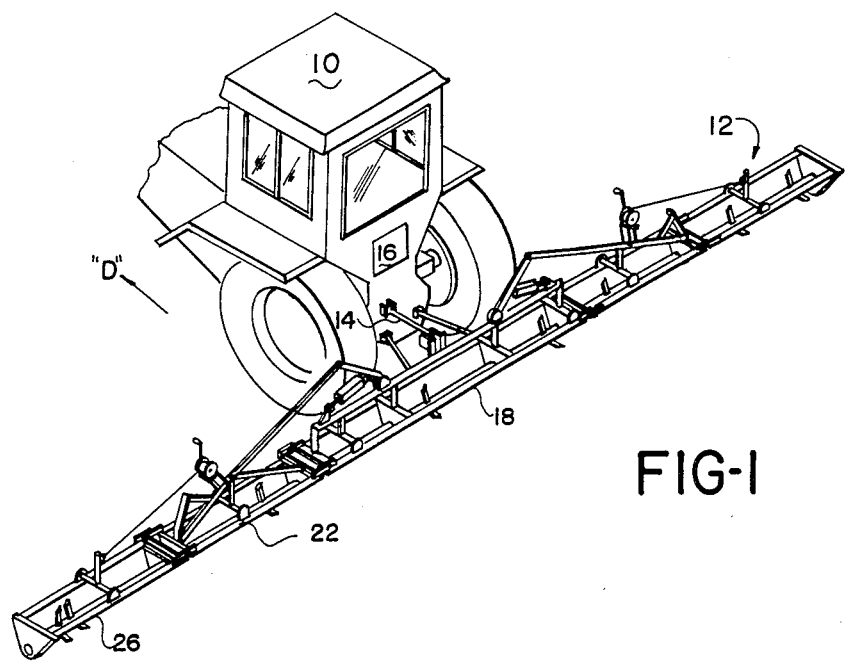
FIG. 1 is a perspective view of a sand fighter according the this invention, shown attached to a tractor which is only schematically and partially shown for the purposes of illustration.

Referring to the drawing, there may be seen a schematic representation of farm tractor 10 with sand fighter 12 attached thereto. It may be seen, schematically represented, that the tractor will be equipped with a power lift hitch 14 and a source 16 of hydraulic fluid under pressure. The tractor hitch 14 includes power lift draft bars on the tractor.

The sand fighter 12 includes five frame sections. Medial section 18 is in the center of the sand fighter. The Medial section has proximal hinges 20 at each end. Proximal section 22 is hinged by the proximal hinges 20 to the medial section. Distal hinges 24 are located on the outboard edge or distal end of each proximal section 22. Distal section 26 is hinged by the distal hinge to the proximal section.

It will be understood from the description, that there are a plurality of contiguous frame sections and each frame section is hinged to the section adjacent to it.

Each section has depending structure at each end by which shaft 28 is journaled to the section. When the sections are extended, the plurality of contiguous frame sections are in a line and the shaft of each section will be about coaxial with the other shafts. Also, the shaft will be normal to the direction of draft as drawn over the land by the tractor 10. The direction of draft is indicated by the letter "D" upon the drawing. A plurality of earth working kickers 30 are attached to the shafts, as is well known in the art. Normally, the kickers will be rotated around the shaft at about 90° or 120° so that the shaft is supported by some of the kickers at all time and the sand fighter has a minimum of vertical movement as it moves across the field to be cultivated.

It will be understood that the shaft rotates freely, and it is the contact of the kickers with the soil being tilled that causes the shaft to rotate.

The sand fighter is somewhat similar to the aerator agricultural implement of HUXFORD, identified above. However, whereas HUXFORD states that he bevels his teeth to cut the soil without undue lifting or tearing of the soil surface, the sand fighter is designed for the express purpose of lifting small patches of soil.

Sand fighter hitch 32 is attached to the medial section 18 and is connected with the tractor hitch 14 to draft the sand fighter as described above and to raise and lower the sand fighter.

It will be understood that the sand fighter cultivates the soil only a minimum amount, and it pulls very lightly and does not require excessive tension, stress, or strain upon the hitch 32 to draw it across the land to be tilled.

Post 34 extends vertically upward from the frame of the distal section 26. The post is spaced away from the distal hinge 24. Cable 35 extends from the distal post 34 to hand winch 36 mounted upon superstructure 38 upon the proximal section 22. Super structure 38 includes stop 40 which limits the folding of the distal section 26 about the distal hinge 24. It is desired that the distal section be stopped so that it is at an angle of about 30° from vertical; i.e., the distal section forms an angle of about 60° with the proximal section 22 when it is in the full folded position against the stop 40. The distal section moves through an arc of about 120° when folded from the extended cultivating position to the folded travel position.

Figure 2:
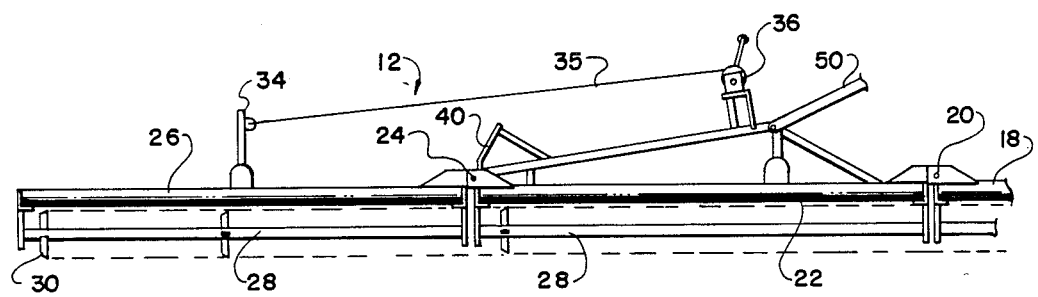
FIG. 2 is a partial rear elevational view of the sand fighter.

The post 34, cable 35, and winch 36 are arranged as shown in the drawings, particularly referring to FIGS. 2, 4, and 5. It may be seen that with the distal section 26 extended, that the cable 35 will prevent excessive drooping or unfolding of the distal section 26 so that the section may be lifted by the hitch 32 (FIG. 4) without the distal section hanging down so far that it would drag the ground. However, in the folded position, as seen in FIG. 5, the cable 35 is basically aligned with the post 34 to hold the section 26 firmly against the stop 40 so that it does not bump and rattle when being transferred; i.e., it is held firmly and snugly in position during transportation.

It is possible for a strong man to lift the distal section for the folding operation without the use of a hand winch. I prefer to provide the hand winch 36 to prevent undue strain upon the operator. Also, the hand winch is desirable so that the distal section is held firmly in place against the stop 40 so that it does not shake or bump during rough travel from one farm to another.

I find hand winches, as are commercially available upon the market for use on boat trailers to be suitable for use as the hand winch 36. Such winches normally have a gear reduction and a dog so that their cable can be locked in position.

Thus it may be seen, as described above, that a manual or hand lifting operation is used to lift the distal section 26. Of course, the frame at the end of the distal section would form a means for manually folding the distal section if a hand winch were not used. Otherwise, hand winch 36, cable 35, and post 34 are parts of a manual means for lifting and folding the distal section 26 about the distal hinge 24.

Figure 3:
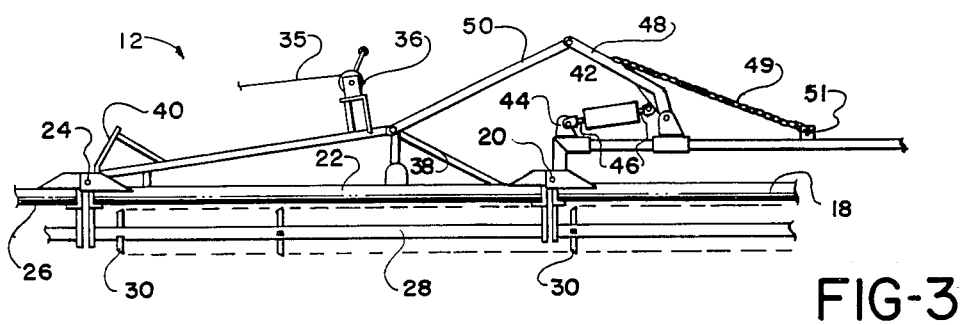
FIG. 3 is a partial rear elevational view of the sand fighter.

Hydraulic cylinder 42 is pivoted by ear 44 or other convenient structure to the medial section 18 near the proximal hinge 20 (FIGS. 3 and 5). The hydraulic cylinder by its rod 46 is connected to arm 48. The arm is pivoted at its lower part to the medial section 18. Pitman 50 interconnects the upper extremity of arm 48 to super structure 38 of the proximal section 22 Therefore, if the pitman 50, arm 48, or super structure 38 are considered to be portions of a lifting mechanism, it may be seen that the extension of the hydraulic cylinder rod 46 will operate the lifting mechanism and operate to fold the proximal section 22 and the distal section 26 carried or attached to the end of the proximal section 22. The proximal section will move upwardly to about 90°.

The hydraulic cylinder 42 is fluidly connected by hoses (not shown in the drawings for clarity) to the source of hydraulic fluid under pressure 16 upon the tractor 10 when in use. Those with ordinary skill in the art would put suitable operating valves to control the folding and unfolding of the proximal sections. As previously described, the distal section is folded manually and also it would be well understood that it would likewise be extended by hand.

As seen in FIGS. 3 and 5, chain 49 is attached from near the upper end of arm 48 to a point upon the medial section 18 inboard of the arm 48. It is attached to a chain holder 51 upon the medial section. The chain holder 51 is inboard of the arm 48. The chain 49 and holder 51 have not been shown in FIGS. 1, 2, and 4 for clarity. Therefore, it may be seen with the sections extended, that the chain in one position, as shown in FIG. 3, will prevent the end of the proximal section from drooping so as to touch the ground when the medial section is lifted by the power lift draft bars of the tractor hitch 14. On the other hand, when the proximal section 22 is folded, as shown by the portion on the right side of FIG. 5, as illustrated in the drawings, the chain 49 can be repositioned in the holder 51 so that it holds the proximal section securely and snugly in the folded section and does not permit it to shake or bump during travel. Of course, those with ordinary skill in the art will realize that hydraulic cylinders 42 commonly are made with stops so that the travel of the rod 46 may be limited in its inward movement. When such a stop is used, the stop upon the hydraulic cylinder 42 may be used rather than the chain 49, as illustrated in FIG. 3 or the left side of FIG. 5.

Each of the hinges will include, fore and aft, ears 52 attached to one section and inside ears 54 attached to the other section (FIG. 6). Hinge bolt 56 would extend through the ears 52 and 54 to provide the hinge. It will be understood, of course, and analysis will show that the hinge, including the hinge bolt 56, withstands any twisting or bending moment that the distal section exerts against the proximal section and the proximal section exerts against the medial section. However, as indicated above, sand fighters run lightly and draft quite easily and lightweight elements are suitable.

The embodiment shown and described above is only exemplary. I do not claim to have invented all the parts, elements or steps described. Various modifications can be made in the construction, material, arrangement, and operation, and still be within the scope of our invention.

The limits of the invention and the bounds of the patent protection are measured by and defined in the following claims. The restrictive description and drawing of the specific examples above do not point out what an infringement of this patent would be, but are to enable on skilled in the art to make and use the invention.

I claim as my invention:

1. In a sand fighter adapted to be drawn in a direction of draft by a tractor having a source of hydraulic fluid under pressure, having:
   a. a plurality of contiguous frame sections,
   b. each frame section hinged to the section adjacent to it,
   c. a shaft journaled to each frame section, and
   d. a plurality of earth working kickers attached to each shaft,
   e. so arranged and constructed that with all the frame sections extended the respective shafts are substantially coaxial and normal to the direction of draft;
the improved structure comprising:
   f. one of the frame sections being a medial section,
   g. hitch means on the medial section for attaching the sand fighter to power lift draft bars of a tractor,
   h. the frame sections hinged at each end of the medial section being proximal sections,
   i. the hinges connecting the medial section and each proximal section being the proximal hinges,
   j. two hydraulic cylinders, each of which is near one of said proximal hinges on the medial section,
   k. each of the hydraulic cylinders mechanically connected to
   l. an arm pivoted to the medial section,
   m. a pitman connecting the arm to the proximal section,
   n. each hydraulic cylinder adapted to be fluidly connected to the source of hydraulic fluid on the tractor,
   o. a chain extending from the arm to
   p. a chain holder on the medial section inboard of the arm, said chain and holder being so arranged and constructed to selectively prevent excessive drooping of the proximal section when extended and to selectively hold the proximal section secure when folded,
   q. the frame sections hinged to the proximal sections being distal sections,
   r. the hinges connecting the proximal and distal sections being distal hinges, and
   s. manual lift means on each of the distal and proximal sections for manually lifting the distal sections about the distal hinges.

2. The invention as defined in claim 1 wherein said manual lift means includes:
   t. a hand winch journaled to each of the proximal sections, and
   u. a cable extending from the hand winch to
   v. a post attached to each distal section.

* * * * *